United States Patent Office 2,761,851
Patented Sept. 4, 1956

2,761,851

PROCESSING OF WAX

Miles Anthony Joanen, Houston, Tex., assignor to Sinclair Refining Company, New York, N. Y., a corporation of Maine No Drawing. Application October 26, 1949,
Serial No. 123,781

2 Claims. (Cl. 260—28.5)

My invention relates to a method of modifying paraffin wax and embraces as a novel composition paraffin wax which has been treated according to the method.

As employed herein, the term "paraffin wax" refers to the hard, crystalline wax derived from distillates obtained upon the fractionation of petroleum oils of the mixed base or paraffin base type. Separation of this wax from the distillate is conveniently effected by chilling the distillate to a temperature below 32° F. and then filtering the solid wax from the oil in a filter press. The wax collected in the filter press is identified in the art as "slack wax" and is characterized in that it contains a large quantity of oil. In most refineries, this oil is removed from the slack wax by "sweating" following a redistillation. Generally the wax is further refined as by treatment with sulfuric acid or percolation through clay, the resulting product being graded according to its properties, such as tensile strength, melting point, oil content, hardness, etc.

Paraffin wax is in extensive use by paper and container manufacturers as a coating material in the production of moisture-proof wrappers and cartons for the food and related industries. Much work has been done in an effort to improve paraffin wax with this use in mind. A large proportion of this work has been directed toward increasing the tensile strength of the wax thereby to make practicable sealing of bread wrappers, for example, by the mere heating of overlapping seams of the waxed paper. Other work has had as its object improvement of the ductility or improvement of the gloss of the wax. Still other work has had as its object the prevention of "blocking" and it is with blocking, particularly, that my invention is concerned.

"Blocking" refers to the tendency of paraffin wax slabs or sheets of paraffin waxed paper stock to adhere to each other in stacks and it also refers to a similar tendency on the part of rolls of paraffin waxed paper.

I have discovered that polyethene is an effective anti-blocking agent when incorporated in paraffin wax and I have further found that when used in the amounts in which it is effective as an anti-blocking agent that it does not materially impair the tensile strength or any other desirable quality of the wax. In fact, by the incorporation of polyethene the hot sealing characteristics, sloughing resistance and gloss are in most instances substantially improved.

As a result of my discovery, slabs of paraffin wax can now be stored over prolonged periods, even at temperatures upwards of 100° F. without sticking and the same is true with respect to waxed paper whether stacked, or stored on rolls. My invention will be recognized as revolutionary by users of paraffin wax, particularly in southern climes, who have stored wax in the form of slabs during the summer season. No previously proposed anti-blocking agent, of which I am aware, matches my agent in effectiveness.

In the practice of my invention, a large number of polyethene compositions of varying properties may be used, but I prefer the solid granular products, particularly the polymeric products of the approximate molecular weight range of 2000 to 15,000. The higher molecular weight materials are probably effective but they are generally incompatible with the wax. In the accompanying Table I, the average properties of typical compositions are given by way of illustration. This table is not to be taken as in any way restrictive of the scope of my invention.

Table I

General properties:
    Specific gravity_____ 0.92.
    Grams per cu. in_____ 15.04.
Mechanical properties:
    Tensile strength (p. s. i.)_____ 1,800.
    Brittle temperature, ° C_____ Below 70.
    Stiffness in flexure (p. s. i.), 25° C. 18,000.
    Elongation (percent)_____ 500.
Electrical properties:
    Volume resistivity (ohms cms.)___ Greater than $10^{15}$.
    Dielectric strength (volts per mil), 1/8" thick. 400–475.
    Dielectric constant ($10^6$ cycles)___ 2.3.
    Power factor ($10^6$ cycles)_____ 0.00030.
Thermal properties:
    Thermal conductivity [$10^{-4}$ cal. $(\text{sec.})^{-1}(\text{cm.})^{-1}(° \text{C.})^{-1}$] (0–15° C.). 8.1.
    Specific heat (cal. per ° C. per gram). 0.53.
    Burning rate _____ Slow.
Stability:
    Water absorption (percent after immersion 24 hrs.). 0.01.
    Effect of sunlight_____ No discoloration.
Solubility:
    Insoluble in all common solvents below 50–60° C.; soluble in chlorinated solvents, aliphatic and aromatic hydrocarbons at elevated temperatures.

The polyethene, of course, is customarily added to the wax with the wax in the liquid state. I generally make the addition at a temperature of about 220° F. At this temperature the polymer readily disperses and becomes miscible upon stirring into crystalline wax. Where desired, a wax concentrate of the polyethene may be prepared for subsequent admixing with additional quantities of wax.

The polyethene is best employed in a concentration of about 3% on the weight of the wax. Concentrations between about 1% and 5%, however, may be employed, depending somewhat upon the molecular weight of the polymer and the nature of the wax. Smaller amounts are relatively less or completely ineffective while larger amounts not only alter the appearance and adversely affect the properties of the wax, but generally are incompatible. I have noted that concentrations of polyethylene of over 5% have a tendency to form ridges and bulges on the wax plain surface after cooling, regardless of the rate of cooling, whereas the surface appearance of waxes containing about 5 weight per cent of polyethylene or less is ordinarily free of ripples. The following data of Table II further illustrate the lack of compatibility of polyethylene in paraffin wax in concentrations above about 5%. The data concern paper which was coated with wax polyethylene compositions. The coated samples were stored at 125° F. for 24 hours and the following observations made:

*Table II*

| Coating Composition | Surface Appearance After Storage at 125° F. for 24 Hours |
| --- | --- |
| 30/32° F. M. P. Paraffin Wax+2% Polyethylene DEM 1865 | Smooth, uniform. |
| 30/32° F. M. P. Paraffin Wax+4% Polyethylene DEM 1865 | Do. |
| 130/32° F. M. P. Paraffin Wax+5% Polyethylene DEM 1865 | Do. |
| 130/32° F. M. P. Paraffin Wax+6% Polyethylene DEM 1865 | Rough, grainy surface. |
| 130/32° F. M. P. Paraffin Wax+8% Polyethylene DEM 1865 | Do. |

The DEM 1865 polymer used in the above tests was polyethylene with molecular weight of about 3700. Higher molecular weight polyethylenes show decreasing compatibility with paraffin wax. For example, polyethylene having molecular weight of about 20,000 is very difficult to disperse in wax even in very low concentrations. Thus a temperature exceeding 200° F. is necessary to effect solution of the higher polymer in a 5 weight per cent concentrate. The odor and taste of the wax, however, tend to go bad at such elevated temperatures and the time consumed in the operation is excessive. Even when the polymer is carefully ground to a size of the order of 14 mesh using a Burr mill after mixing with crushed Dry Ice to prevent sticking, the time and temperature to effect solution in concentrations suitable for blending off are excessive. For example, when a 2 per cent blend was prepared from a 25 per cent concentrate of polyethylene 20,000 in a 130° to 132° F. melting point wax, the polymer precipitates on cooling as a light floc and upon solidification separates as small grains within the wax.

I have found in general that the hardness of the wax as measured by the Abraham consistometer at 100° F. increases with increasing amounts of polyethylene. I consider that an increase in hardness as indicated by this test is a fairly reliable indication of a reduction in blocking tendency.

Although the tendency of a wax to block is prevalent and very troublesome in the practical arts, it is very difficult to evaluate in the laboratory or by means of control tests. One widely used test for blocking tendency is TAPPI Tentative Standard T477m47. According to this procedure the blocking tendency of paper coated with wax or wax blends is tested at 75 per cent relative humidity. The following results are illustrative of the substantial improvement effected by adding lower molecular weight polyethylenes to refined paraffin wax in the 1 to 5 per cent range. It should be noted that if the proportions of polyethylene are increased above this range, little, if any, improvement in blocking resistance is found and the blends no longer represent homogeneous films because of the increasing incompatibility of the polyethylene in the wax above about 5 per cent concentration. The results are reported according to the following quantitative scale:

0 Perfect—no adhesion, no marring
    1–2 Adhesion but no marring
    3–5 Adhesion and slight marring
    5–8 Adhesion and marring
    8–10 Completely sealed together

*Table III*

| | Weight Percent Polyethylene in 130°/132° F. Melting Point (ASTM) Crystalline Paraffin Wax | | | | | | | | |
| --- | --- | --- | --- | --- | --- | --- | --- | --- | --- |
| | 0% | 1.0% | 2.0% | 3.0% | 4.0% | 5.0% | 6.0% | 8.0% | 10.0% |
| Blocking Results Tested at— | | | | | | | | | |
| 95° F | 4 | 2 | 1 | 1 | 1 | 3 | | | 3 |
| 100° F | 8 | 7 | 4 | 5 | 2 | 5 | | | 6 |
| 105° F | 9 | 8 | 8 | 6 | 8 | 6 | 6 | 4 | 7 |
| 110° F | 10 | 9 | 8 | 9 | 8 | 6 | 7 | 7 | 7 |
| 115° F | | 9 | 10 | 9 | 10 | 7 | 10 | 9 | 8 |

*Table IV*

| | Weight Percent Polyethylene DLYT (12,000 mol. wt.) in 125°/127° F. Melting Point (ASTM) Crystalline Wax | | | | |
| --- | --- | --- | --- | --- | --- |
| | 0% | 1.0% | 3.0% | 5.0% | 10.0% |
| Blocking Results Tested at 105° F— | | | | | |
|   Face to Face | 6 | 3 | 2 | 0 | 2 |
|   Back to Face | 2 | 2 | 1 | 3 | 2 |
| 110° F.— | | | | | |
|   Face to Face | 7 | 4 | 3 | 3 | 2 |
|   Back to Face | 3 | 3 | 2 | 3 | 2 |
| 115° F.— | | | | | |
|   Face to Face | 8 | 4 | 4 | 4 | 2 |
|   Back to Face | 5 | (*) | 2 | 3 | 3 |

*Diffused into paper, no adhesion, no marring.

Although such laboratory tests give a reliable indication of blocking tendency, I have found that practical tests on the wax in the blend are more expressive with respect to the value of wax polyethylene blends in the range of my invention. For example, in one plant test 40 slabs of ordinary fully refined wax and 40 slabs of anti-blocking wax containing 3 per cent polyethylene 3,700 were placed in two individual stacks. The slabs measured 19 inches in length by 12 inches in width by 1½ inches in thickness and weighed approximately 10 pounds each. Blocking tendency was checked using an improved chattlion spring balance reading from 0 to 50 in pounds and having a flat face gauge indicator with a ring at the top and a hook at the bottom. Using this spring scale, the anti-blocking slabs containing the 3 per cent polyethylene could be released from one another with a pull of approximately 20 pounds and two or more slabs with a vertical weight pull of about 35 pounds. It was impossible to release one or more slabs of the fully refined wax without polyethylene added with a pull up to 50 pounds reading. The straight wax slabs blocked excessively and could not be shaken or pulled apart in a pile of about 30 slabs. By contrast a stack of 4 or 5 of the anti-blocking slabs could be easily released from the 40 slab pile. The temperature on the date of test varied from a low of 54° F. and a high of 74° F. The average temperature for a period of approximately one month preceding the test varied from a low of 50° F. and a high of 68° F. In other plant performance tests, I have found that polyethylene in wax used for coating paper improves blocking resistance markedly both with respect to storage in rolls under ordinary warehouse conditions and in shipping bundles of cut wax coated paper. For example, I have found that 50 pound rolls of 16-inch by 18-inch paper coated with wax containing 130° to 133° F. polyethylene 3,700 did not block when exposed to a temperature of 100° F. for a period of 14 hours. Rolls similarly coated with ordinary 130° to 132° F. wax showed considerable penetration of the wax into the sheet and also blocked badly.

In other tests waxed loaves of bread were tested for sloughing by exposing the packages to a temperature of 115° F. in an automobile with windows closed out in the sun for several hours. Under these conditions, the wax polyethylene coating did not rub off the wrapper at all while the ordinary wax coating sloughed very badly. I have also noticed improvements in gloss and heat sealing qualities of the wax polyethylene blends.

The effect of adding 3 per cent polyethylene to fully refined wax having a melting point of 137° F. is illustrated in the following table:

Table V

|  | Fully Refined Paraffin Wax Without Modifier | 97% Fully Refined Wax: 3% Polyethylene [1] |
|---|---|---|
| AMP Melting Point, ° F | 137.0 | 136.8 |
| Hardness: |  |  |
| 90° | 27.6 | 26.7 |
| 100° | 12.6 | 15.6 |
| Tensile Strength | 299.6 | 277.2 |
| Compatibility |  | O. K. |
| MVTR [2] (Gms. H₂O/100 sq. in. per 24 hours) | 1.0 | 0.9 |
| Blocking Resistance | Poor | Very Good. |
| Sloughing | Normal | Better than normal. |

[1] Bakelite polyethylene DEM 1865 (molecular weight 3700).
[2] Moisture vapor transmission rate.

Table VI, submitted in further illustration of the invention, provides a comparison between a wax modified according to the invention, the wax being a fully refined crystalline wax derived from an East Texas crude, and a specially prepared paper wax now in current use by many waxed paper manufacturers, this wax being identified in the table as "Competitive wax." From this table it is to be observed that my modified wax is superior to the competitive wax, not only in blocking resistance but also in the matter of heat seal and gloss. The coated paper used in these tests was produced by water-waxing in a paper converting plant using conventional equipment, while the heat seal performance test, as indicated, was carried out in a commercial bakery.

Table VI

|  | East Texas Fully Refined Wax | Modified East Texas Wax [1] | Competitive Wax |
|---|---|---|---|
| Gravity | 41.5 | 41.2 | 41.2 |
| Viscosity at 210° F. (SSU) | 41 | 43 | 39. |
| Appearance in Slab Form | White | Opaque | White. |
| Color, Saybolt | 30 | 30 | 30. |
| M. P. (ASTM) | 133.25 | 133.5 | 131.75 |
| M. P. (AMP) |  | 136.2 | 135.0. |
| Tensile Strength, #/l. sq. in. | 235 | 250 | 160. |
| California Oil, Percent | .51 | .52 | .51 |
| Acid, ASTM | OK | OK | OK. |
| Penetration: |  |  |  |
| Needle at 77° F | 12 | 11 | 15. |
| Needle at 85° F | 18 | 19 | 16. |
| Needle at 90° F | 25 | 24 | 22. |
| Needle at 100° F | 50 | 54 | 50. |
| Hardness at 90° F | 29.6 | 23.0 | 32.6. |
| Hardness at 100° F | 14.6 | 15.3 | 11.3. |
| Tensile Strength (Tinius Olsen #/l, sq. in) |  | 234 | 150. |
| Odor at 200° F | None | Slight | None. |
| Discoloration with Concentrated Sulfuric Acid | do | do | Do. |
| Surface Wax per Ream on Test Sheet |  | 12.3#/ream | 13.2#/ream. |
| Heat Seal, grams/linear inch required to rupture seal |  | 9.9 | 8.2. |
| Heat Seal, Bakery Performance Test |  | Good | Fair. |
| Gloss on Paper |  | Excellent | Good. |
| Sloughing off Paper |  | None | Excessive. |
| Blocking, Stub Roll Exposed in Oven 14 hours at 100° F. |  | do | Bad. |
| Blocking, Loaf of Wrapped Bread Exposed in Closed Car in Sun 4 hours, Temperature 115° F. |  | do | Very Bad. |

[1] 3% Bakelite polyethylene DEM 1865 (molecular weight 3700).

My invention, of course, is not limited to paraffin wax as employed in the production of bread wrappers and the like as it may also be utilized, for example, in the manufacture of moisture-proof paper cartons and other containers. The invention is not, in fact, limited to the paper converting industry. I have described it with particular reference to that industry merely because, at the moment, it is in that field that it appears to have the greatest commercial promise.

The polyethylene employed in the tests of Tables V and VI has a melting point (ASTM) of 200° F. and a needle penetration at 77° F. of 24.

Further examples of useful polyethylene polymers for the purpose of my invention include:

Table VII

| Polymer | Mol. Wgt. | R & B. M. P., ° F. |
|---|---|---|
| DEM 1865 | 3,700 | 203.9 |
| DEM 1883 | 7,000 | 214.7 |
| DEM 1851 | 10,500 | 223.7 |
| DEM 1842 | 12,125 | 225.5 |
| DEM 1833 | 14,300 | 230.0 |

This application is a continuation-in-part of my application Serial No. 705,249, filed October 23, 1946, now abandoned, and is intended to more precisely define the nature of the polyethylene and the proportions disclosed therein.

I claim:

1. A modified paraffin wax composition of improved resistance to blocking consisting essentially of crystalline paraffin wax having incorporated therein about 3 percent polyethylene having a molecular weight of the order of about 3,700.

2. A method of improving the blocking resistance of crystalline paraffin wax which comprises preparing a mixture which consists essentially of crystalline paraffin wax having incorporated therein about 3 percent polyethylene having a molecular weight of the order of about 3,700.

References Cited in the file of this patent

UNITED STATES PATENTS

| 2,504,270 | MacLaren et al. | Apr. 18, 1950 |
| 2,551,087 | Barnhart et al. | May 1, 1951 |

OTHER REFERENCES

British Plastics, May 1945, pages 213 and 214.
"Alkathene," Imperial Chemical Industries, November 1943, page 4.
British Plastics, March 1945, page 96.
British Plastics, April 1945, pages 148–151.